(12) United States Patent
Cook et al.

(10) Patent No.: US 8,490,086 B1
(45) Date of Patent: Jul. 16, 2013

(54) FILTERING I/O COMMUNICATION OF GUEST OS BY INSERTING FILTER LAYER BETWEEN HYPERVISOR AND VM AND BETWEEN HYPERVISOR AND DEVICES

(75) Inventors: Randall R. Cook, Springville, UT (US); Kenneth Berryman, San Mateo, CA (US)

(73) Assignee: Symantec Corporation, Mountain View, CA (US)

( * ) Notice: Subject to any disclaimer, the term of this patent is extended or adjusted under 35 U.S.C. 154(b) by 922 days.

(21) Appl. No.: 12/495,420

(22) Filed: Jun. 30, 2009

(51) Int. Cl.
*G06F 9/455* (2006.01)
*G06F 11/00* (2006.01)

(52) U.S. Cl.
USPC .................................. 718/1; 726/22

(58) Field of Classification Search
USPC ................................... 718/1; 726/22
See application file for complete search history.

(56) References Cited

U.S. PATENT DOCUMENTS

| | | | |
|---|---|---|---|
| 7,272,831 B2* | 9/2007 | Cota-Robles et al. | 718/1 |
| 8,166,474 B1* | 4/2012 | Delco et al. | 718/1 |
| 8,190,778 B2* | 5/2012 | Shanbhogue | 709/250 |
| 2006/0070066 A1* | 3/2006 | Grobman | 718/1 |
| 2009/0172660 A1* | 7/2009 | Klotz et al. | 718/1 |
| 2009/0254990 A1* | 10/2009 | McGee | 726/22 |
| 2010/0100718 A1* | 4/2010 | Srinivasan | 713/1 |

* cited by examiner

*Primary Examiner* — Meng An
*Assistant Examiner* — Brian Chew
(74) *Attorney, Agent, or Firm* — ALG Intellectual Property, LLC

(57) ABSTRACT

A computer-implemented method for filtering input/output communications of guest operating systems may include: 1) identifying a guest operating system running in a virtual machine, 2) creating an input/output filtering layer that resides outside the guest operating system, 3) intercepting, at the input/output filtering layer, an input/output communication involving the guest operating system, and then 4) performing a filtering operation on the input/output communication. Various other methods, systems, and computer-readable media are also disclosed.

13 Claims, 6 Drawing Sheets

FILTERING I/O COMMUNICATION OF GUEST OS BY INSERTING FILTER LAYER BETWEEN HYPERVISOR AND VM AND BETWEEN HYPERVISOR AND DEVICES

BACKGROUND

Consumers and businesses increasingly rely on the stability, security, and flexibility of their computing systems. For this reason, many computing systems include software components (such as anti-virus software, backup software, or application-streaming software) that improve the system's stability, security, and/or flexibility by filtering input/output (I/O) operations (e.g., monitoring, manipulating, and/or modifying I/O operations) performed within an operating system of the system.

Generally, such filtering components execute within the same operating system whose I/O operations the filtering components are meant to regulate. However, filtering components that execute within the same operating system that the components are designed to regulate may suffer from a variety of disadvantages. For example, such filtering components may be vulnerable to the very problem they are designed to address: e.g., an anti-virus component may be targeted by malware that exploits an operating-system's vulnerabilities or a backup component may lose data due to an operating system failure. Such filtering components may also be limited to operating within the specific operating system for which they are designed.

In an attempt to address these problems, software vendors may integrate certain filtering components into a hypervisor that monitors a virtual machine running a guest operating system. The filtering components may then filter the I/O communications of the guest operating system from the hypervisor. However, this approach may also suffer from a variety of deficiencies. For example, due to the large number of commercially available hypervisors, this approach may require software vendors to design each of their filtering components for a specific type of hypervisor. Furthermore, some hypervisors may not be extensible with filtering components, which may force users to choose between a preferred hypervisor that is not extensible and an otherwise inferior hypervisor that is extensible.

SUMMARY

As will be described in greater detail below, the instant disclosure generally relates to systems and methods for filtering input/output communications of guest operating systems. In one example, a method for performing such a task may include: 1) identifying a guest operating system running in a virtual machine, 2) creating an input/output filtering layer that resides outside the guest operating system, 3) intercepting, at the input/output filtering layer, an input/output communication involving the guest operating system, and then 4) performing a filtering operation on the input/output communication.

In some embodiments, the input/output filtering layer may reside between the guest operating system and a hypervisor. In other embodiments, the input/output filtering layer may reside between the hypervisor and a set of hardware devices (e.g., a storage device, a network interface card, etc.). Alternatively, in systems where a hypervisor is not present, the input/output filtering layer may reside between a guest operating system and a set of hardware devices.

Examples of input/output communications that may be intercepted at the input/output filtering layer may include read or write requests to a storage device, communications with a network interface card, and the like. Filtering operations performed on input/output communications may include, for example, filtering operations for anti-virus protection, backups, application streaming, virtualization, and/or security purposes.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
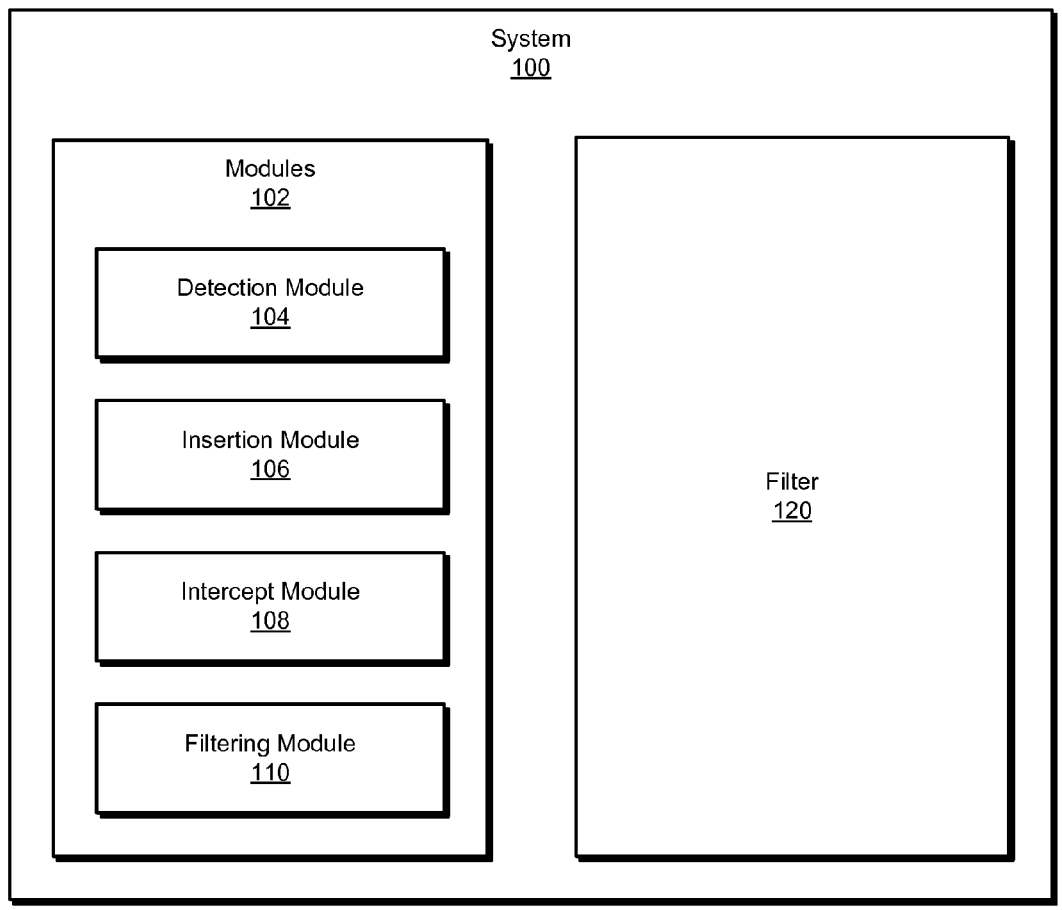
FIG. 1 is a block diagram of an exemplary system for filtering input/output communications of guest operating systems.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

As will be described in greater detail below, the instant disclosure generally relates to systems and methods for filtering input/output communications of guest operating systems. As used herein, the phrase "filtering a communication" may refer to monitoring, manipulating, and/or modifying a communication in its course and/or substance. In addition, the phrase "input/output communication" (or "I/O communication") may refer to any communication at any point between an operating system and a hardware device. An input/output communication may also refer to an I/O event within an operating system.

Figure 2:
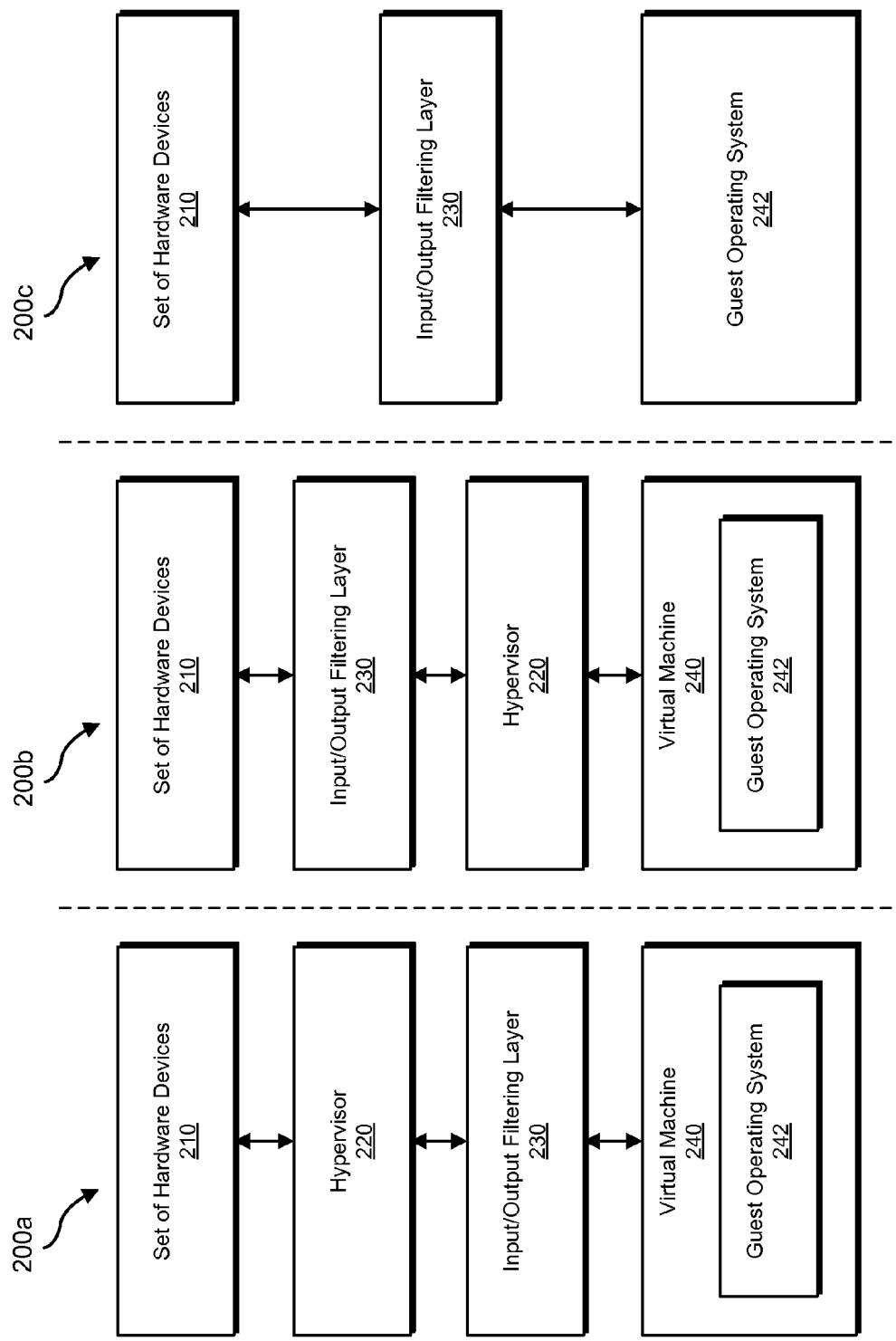
FIG. 2 is a block diagram of an exemplary system for filtering input/output communications of guest operating systems in various embodiments.
Figure 3:
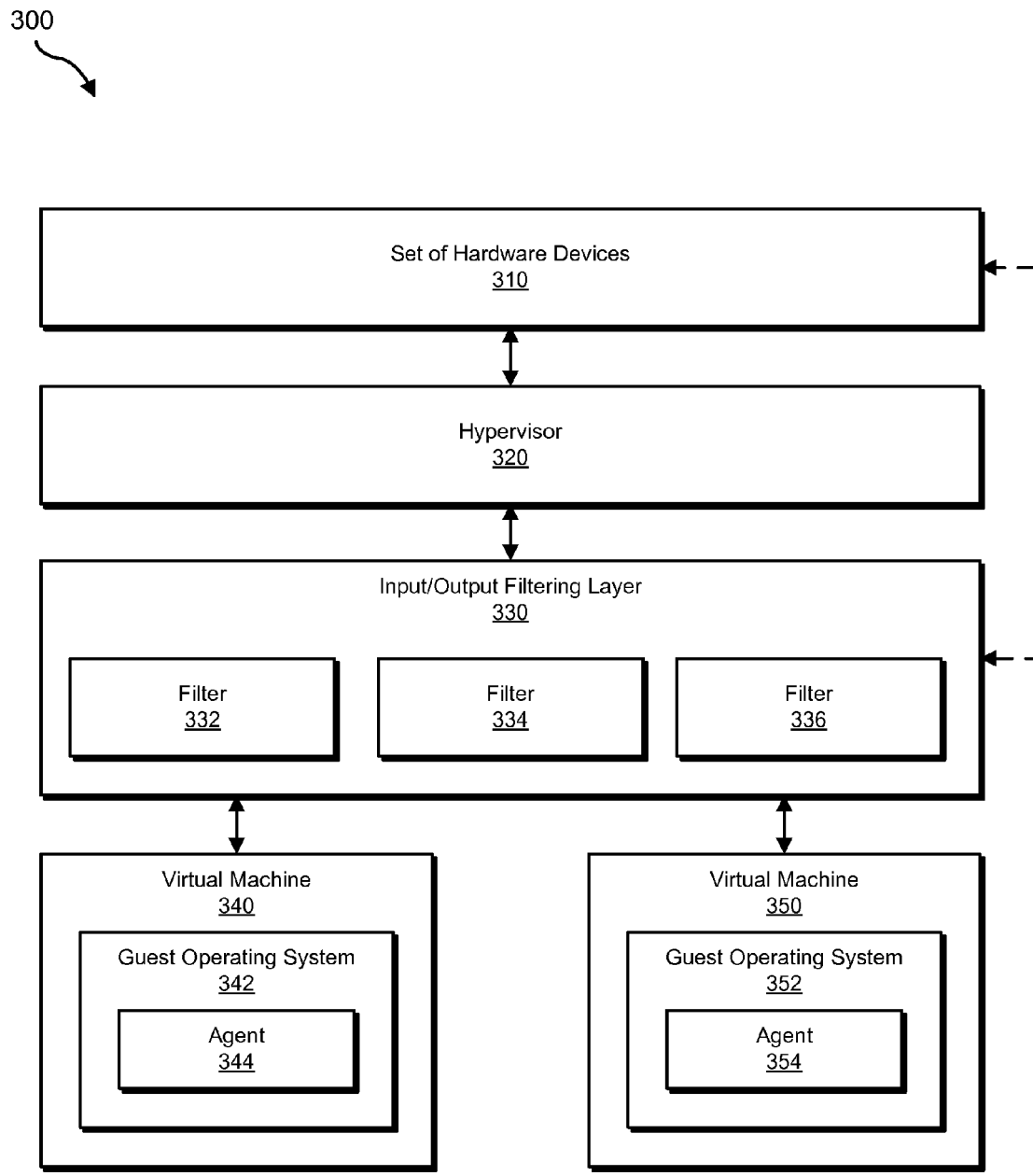
FIG. 3 is a block diagram of an exemplary system for filtering input/output communications of guest operating systems.

The following will provide, with reference to FIGS. 1-3, detailed descriptions of exemplary systems for filtering input/output communications of guest operating systems. Detailed descriptions of corresponding computer-implemented methods will also be provided in connection with FIG. 4. In addition, detailed descriptions of an exemplary computing system and network architecture capable of implementing one or more of the embodiments described herein will be provided in connection with FIGS. 5 and 6, respectively.

FIG. 1 is a block diagram of an exemplary system 100 for filtering input/output communications of guest operating systems. As illustrated in this figure, exemplary system 100 may include one or more modules 102 for performing one or more tasks. For example, and as will be explained in greater detail below, exemplary system 100 may include a detection module 104 programmed to identify a guest operating system running in a virtual machine. Exemplary system 100 may also include an insertion module 106 programmed to create an input/output filtering layer that resides outside the guest operating system.

In addition, and as will be described in greater detail below, exemplary system 100 may include an intercept module 108 programmed to intercept, at the input/output filtering layer, an input/output communication involving the guest operating system. Exemplary system 100 may additionally include a filtering module 110 programmed to perform a filtering operation on the input/output communication. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, as will be described in greater detail below, one or more of modules 102 may represent software modules stored and configured to run on one or more computing devices, such as the devices and/or layers illustrated in FIG. 2 (e.g., hypervisor 220 and/or input/output filtering layer 230), computing system 510 in FIG. 5, and/or portions of exemplary network architecture 600 in FIG. 6. One or more of modules 102 in FIG. 1 may also represent all or portions of one or more special-purpose computers configured to perform one or more tasks.

As illustrated in FIG. 1, exemplary system 100 may also include a filter 120. As will be explained greater detail below, filter 120 may represent executable code and/or a set of rules for filtering input/output communications. In some embodiments, filter 120 may represent a portion of filtering module 110. Filter 120 may also represent an extension or a plug-in to an input/output filtering layer created by insertion module 106, as will be discussed in greater detail below.

System 100 in FIG. 1 may be deployed in a variety of ways. In one example, one or more of modules 102 from system 100 may represent software modules stored and configured to run on the devices and/or layers illustrated in FIG. 2. FIG. 2 is a block diagram of exemplary systems 200a, 200b, and 200c for filtering input/output communications of guest operating systems. As illustrated in this figure, exemplary system 200a may include a set of hardware devices 210 in communication with a hypervisor 220. System 200a may also include an input/output filtering layer 230 in communication with hypervisor 220 and a virtual machine 240. In one example, a guest operating system 242 may run within virtual machine 240.

Hardware devices 210 in FIG. 2 may represent any form of hardware device capable of input/output communications. For example, hardware devices 210 may include a storage device and/or a network interface card. In addition, hypervisor 220 may refer to any system or module that allows one or more guest operating systems to run on a computing system.

Examples of hypervisor 220 include, without limitation, VMWARE, ORACLE VM, ESX SERVER, LYNXSECURE, TRANGO, IBM POWER, and/or any other suitable hypervisor or virtualization software. In one example, hypervisor 220 may manage communications between hardware devices 210 and guest operating system 242. In some examples, hypervisor 220 may include one or more of modules 102 from FIG. 1 (e.g., detection module 104 and/or insertion module 106).

Guest operating system 242 generally represents any operating system running within a virtualized environment, such as a virtual machine. Examples of guest operating system 242 include, without limitation, MICROSOFT WINDOWS, UNIX, LINUX, and/or any other suitable operating system. Similarly, virtual machine 240 may represent any virtualized environment in which a guest operating system may run separately from a host operating system.

Input/output filtering layer 230 generally represents any collection of executable instructions and/or filtering rules that may intercept and filter input/output communications. In some examples, input/output filtering layer 230 may include one or more of modules 102 from FIG. 1 (e.g., detection module 104, intercept module 108, and/or filtering module 110). In one example, and as will be described in greater detail below, input/output filtering layer 230 may: 1) intercept an input/output communication involving guest operating system 242 and then 2) perform a filtering operation on the input/output communication.

In some embodiments, insertion module 106 may place input/output filtering layer 230 between hypervisor 220 and virtual machine 240, as depicted by system 200a. As used herein, the term "between" may generally indicate a mediation of communication. For example, if input/output filtering layer 230 resides between hypervisor 220 and virtual machine 240, then input/output filtering layer 230 may mediate the communication of hypervisor 220 and virtual machine 240. In certain embodiments, and as will be explained in greater detail below, intercept module 108 and/or filtering module 110 from FIG. 1 may reside in input/output filtering layer 230.

In other embodiments, insertion module 106 may place input/output filtering layer 230 between hardware devices 210 and hypervisor 220, as depicted by system 200b. Insertion module 106 may also place portions of input/output filtering layer 230 between both: 1) hardware devices 210 and hypervisor 220 and 2) hypervisor 220 and virtual machine 240.

Insertion module 106 may also place input/output filtering layer 230 between hardware devices 210 and guest operating system 242, as depicted by system 200c. In embodiments represented by this system, input/output filtering layer 230 may operate outside the context of a hypervisor. For example, input/output filtering layer 230 may intercept input/output communications between guest operating system 242 and hardware devices 210.

Figure 4:
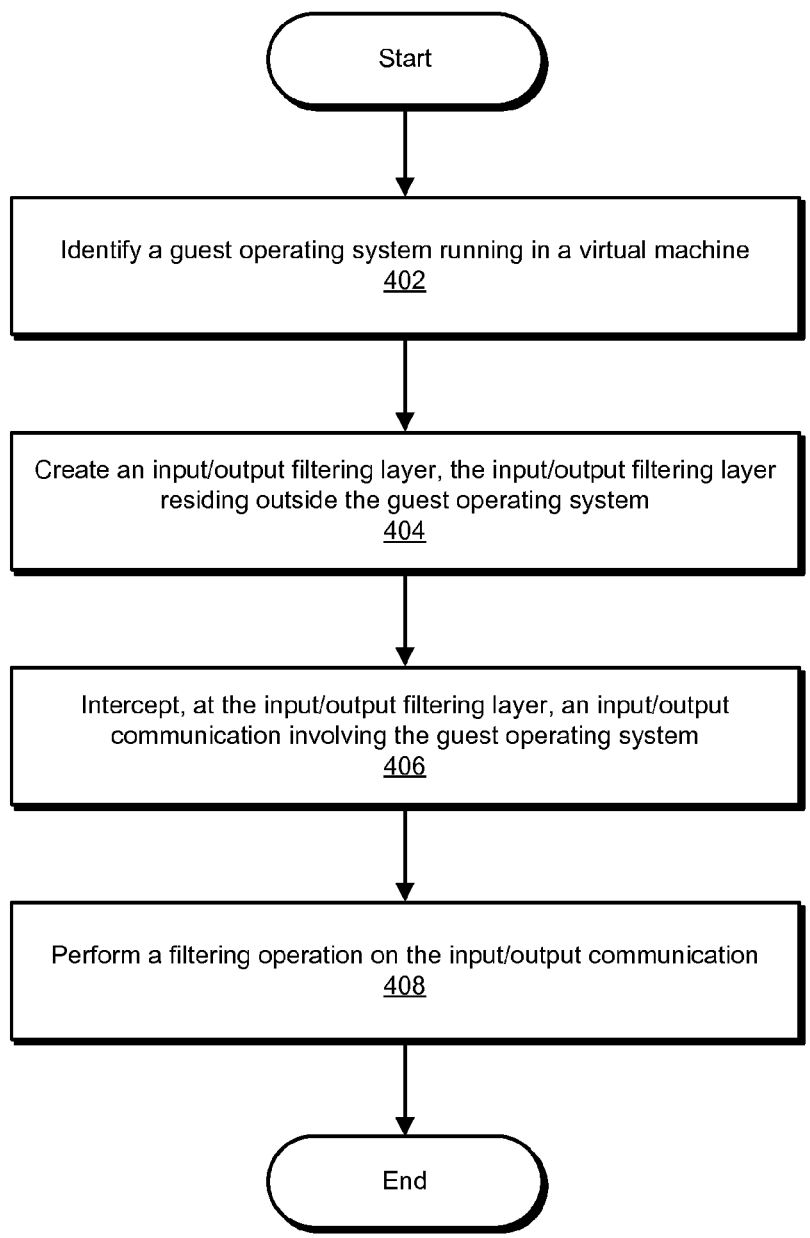
FIG. 4 is a flow diagram of an exemplary method for filtering input/output communications of guest operating systems.

FIG. 4 is a flow diagram of an exemplary computer-implemented method 400 for filtering input/output communications of guest operating systems. The steps shown in FIG. 4 may be performed by any suitable computer-executable code and/or computing system. In some embodiments, the steps shown in FIG. 4 may be performed by one or more of the components of system 100 in FIG. 1, systems 200a, 200b, and/or 200c in FIG. 2, and/or system 300 in FIG. 3 (as will be explained in greater detail below).

For example, at step 402 in FIG. 4, detection module 104 may, as part of system 100 in FIG. 1, identify a guest operating system running in a virtual machine. For example, hypervisor 220 (which may, as detailed above, include detection module 104 from FIG. 1) may identify guest operating system 242 running in virtual machine 240 in FIG. 2.

Detection module 104 may perform step 402 in a variety of ways. In one example, detection module 104 may identify a guest operating system running in a virtual machine by: 1) accessing a list of virtual machines monitored by a hypervisor (e.g., hypervisor 220 in FIG. 2), 2) identifying at least one virtual machine on this list (e.g., virtual machine 240), and then 3) identifying a guest operating system running within this virtual machine (e.g., guest operating system 242 running on virtual machine 240).

Additionally or alternatively, detection module 104 in FIG. 1 may detect instantiation of a guest operating system under a hypervisor. For example, as illustrated in FIG. 3, an input/output filtering layer 330 (which may include detection module 104) may monitor a hypervisor 320 for new guest operating systems placed or initiated under hypervisor 320. As illustrated in FIG. 3, input/output filtering layer 330 may communicate with a set of hardware devices, hypervisor 320, a virtual machine 340, and a virtual machine 350.

In some embodiments, and as illustrated in FIG. 3, insertion module 106 may place input/output filtering layer 330 between hypervisor 320 and virtual machines 340 and 350. In these embodiments, detection module 104 in FIG. 1 may detect instantiation of a new virtual machine and insertion module 106 may extend input/output filtering layer 330 to the new virtual machine. For example, if input/output filtering layer 330 detects instantiation of virtual machine 350 under hypervisor 320, insertion module 106 may extend input/output filtering layer 330 to intercept communications between hypervisor 320 and virtual machine 350.

Returning to FIG. 4, at step 404 insertion module 106 from FIG. 1 may create an input/output filtering layer that resides outside the guest operating system identified in step 402. For example, hypervisor 220 (which may, as detailed above, include insertion module 106) may create input/output filtering layer 230 outside of guest operating system 242 in FIG. 2. Similarly, hypervisor 320 may create input/output filtering layer 330 outside of guest operating systems 342 and 352 in FIG. 3.

Insertion module 106 may create an input/output filtering layer in a number of contexts. In some embodiments, insertion module 106 may create the input/output filtering layer outside a hypervisor that monitors the virtual machine. In this example, insertion module 106 may create the input/output filtering layer in various points in a hypervisor stack. For example, as depicted by system 200a in FIG. 2, insertion module 106 may create input/output filtering layer 230 between hypervisor 220 and guest operating system 242 (i.e., virtual machine 240).

Insertion module 106 may place an input/output filtering layer between a hypervisor and a guest operating system in a variety of ways. For example, insertion module 106 may place an input/output filtering layer between a hypervisor and a guest operating system by: 1) configuring the hypervisor to send input/output communications meant for the guest operating system to the input/output filtering layer (e.g., configuring hypervisor 220 in FIG. 2 to send input/output communications to input/output filtering layer 230) an/ord 2) configuring the virtual machine running the guest operating system to send input/output communications meant for the hypervisor to the input/output filtering layer (e.g., configuring virtual machine 240 in FIG. 2 running guest operating system 242 to send input/output communications meant for hypervisor 220 to input/output filtering layer 230). Additionally or alternatively, insertion module 106 may install a monitoring system for intercepting communications between the hypervisor and the virtual machine.

In some contexts, insertion module 106 may create an input/output filtering layer when the hypervisor is initiated (i.e., before any virtual machines are initialized). For example, insertion module 106 may create input/output filtering layer 230 in FIG. 2 when hypervisor 220 is initiated and before virtual machine 240 is initialized.

In other contexts, insertion module 106 may create an input/output filtering layer for a guest operating system running in a virtual machine when detection module 104 detects instantiation of the guest operating system under a hypervisor. For example, insertion module 106 may insert input/output filtering layer 230 in FIG. 2 between hypervisor 220 and guest operating system 242 when detection module 104 detects instantiation of guest operating system 242 under hypervisor 220. Generally, insertion module 106 may create an input/output filtering layer between the hypervisor and the guest operating system in any way that may result in the input/output filtering layer mediating the input/output communications of the hypervisor and the guest operating system.

Alternatively, as mentioned above with reference to system 200b in FIG. 2, insertion module 106 may create an input/output filtering layer between a hypervisor and a set of hardware devices. Insertion module 106 may create an input/output filtering layer between a hypervisor and a set of hardware devices in a variety of ways. For example, insertion module 106 may create a set of hooks for every attempt by a hypervisor to access a hardware device (e.g., insertion module 106 may create a set of hooks for every attempt by hypervisor 220 in FIG. 2 to access one of hardware devices 210). Generally, insertion module 106 may create an input/output filtering layer between a hypervisor and a set of hardware devices in any way that may result in the input/output filtering layer mediating the input/output communications of the hypervisor and the guest operating system.

In another example, and as mentioned above with reference to system 200c in FIG. 2, insertion module 106 may create an input/output filtering layer between a guest operating system and a set of hardware devices. Insertion module 106 may create an input/output filtering layer between a guest operating system and a set of hardware device in any suitable manner. For example, insertion module 106 may create an input/output filtering layer between a guest operating system and a set of hardware devices (e.g., insertion module 106 may create input/output filtering layer 230 in FIG. 2 between guest operating system 242 and hardware devices 210) using one or more of the methods discussed above.

In various embodiments, the input/output filtering layer created in step 404 may reside outside of a hypervisor layer. In other words, the input/output filtering layer (e.g., input/output filtering layer 230 in FIG. 2) may not reside within a hypervisor, but may instead operate in a layer separate from any hypervisor. In this example, the input/output filtering layer may access a set of hardware devices directly. For example, input/output filtering layer 330 in FIG. 3 may receive or send an input/output communication to monitor and manage virtual machines 340 and 350, which communication may be unrelated to the role of hypervisor 320, directly to hardware devices 310.

Returning to FIG. 4, at step 406 intercept module 108 from FIG. 1 may intercept, at the input/output filtering layer created in step 404, an input/output communication involving the guest operating system identified in step 402. For example, input/output filtering layer 230 (which may, as detailed above, include intercept module 108) may intercept an input/output communication involving guest operating system 242 in FIG. 2.

Intercept module 108 may intercept input/output communications in a variety of contexts. For example, intercept module 108 may intercept an input/output communication when a low-level input/output datum arrives at the input/output filtering layer created by insertion module 106.

In some embodiments, intercept module 108 may intercept input/output communications via an agent inserted into a guest operating system. For example, insertion module 106 from FIG. 1 may insert agents 344 and 354 into guest operating systems 342 and 352 in FIG. 3, respectively. Agents 344 and 354 generally represent any set of computer-executable executable instructions and/or modules that may communicate with an input/output filtering layer. In the example illustrated in FIG. 3, agents 344 and 354 may communicate with input/output filtering layer 330 regarding guest operating systems 342 and 352, respectively.

For example, agent 344 may intercept a high-level input/output event within guest operating system 342 and forward the same to input/output filtering layer 330. A high-level input/output event may include: 1) any input/output event not yet fully processed by a guest operating system into a low-level input/output communication, 2) any input/output event constructed by a guest operating system from a low-level input/output communication, or 3) any other potentially relevant input/output event. For example, when guest operating system 342 in FIG. 3 writes to a file, agent 344 may intercept the file-write event and forward information about the same to input/output filtering layer 330. In this example, input/output filtering layer 330 may receive information about the input/output event at a file level of abstraction in addition to, or instead of, at a block level of abstraction.

In one example, insertion module 106 may insert agents 344 and 354 into guest operating systems 342 and 352, respectively, upon instantiation of guest operating systems and 342 and 352. In some embodiments, agents 344 and 354 may include parts of intercept module 108 and/or filtering module 110.

Returning to FIG. 4, at step 408 filtering module 110 may perform a filtering operation on the input/output communication intercepted in step 406. For example, input/output filtering layer 230 (which may, as detailed above, include filtering module 110) may perform a filtering operation on an intercepted input/output communication involving guest operating system 242 in FIG. 2. Upon completion of step 408, exemplary method 400 in FIG. 4 may terminate.

Filtering module 110 may filter input/output communications in a variety of ways. In some embodiments, filtering module 110 may filter input/output communications using one or more filters inserted into an input/output filtering layer by insertion module 106. For example, as illustrated in FIG. 3, filtering module 110 may perform a filtering operation through one or more filters 332, 334, and 336 inserted into input/output layer 330 by insertion module 106.

Insertion module 106 may insert a filter into an input/output filtering layer in a variety of ways. For example, insertion module 106 may insert a filter into an input/output filtering layer by, for example, installing a plug-in or extension, writing to a configuration file, adding a filtering rule set to the input/output filtering layer, and/or in any other manner that results in the performance of the filtering operating by the input/output filtering layer.

A filter (such as filters 332, 334, and/or 336 in FIG. 3) may represent a plug-in or extension, a rule set, a set of instructions, and/or a configuration for intercepting and/or filtering communications between a hypervisor and one or more guest operating systems. This filter may perform a variety of tasks and/or accomplish a variety of goals. For example, a filter may be used to: 1) monitor input/output communications involving a guest operating system (such as by searching for malware fingerprints in Internet communications), 2) modify the behavior of a guest operating system (such as by prohibiting certain system files from being modified), 3) expand the capabilities of a guest operating system (such as cloud computing), and/or 4) expand the capabilities of a virtual machine (such as by adding a virtual device to a virtual machine).

A filter, such as filter 332, 334, and/or 336 in FIG. 3, may perform one or more filtering functions. For example, a filter may include an anti-virus filter configured to prevent write attempts that appear malicious, remove malicious content from a network communication, and/or observe suspicious read attempts that may represent malicious attempts to gather information. A filter may also include a backup filter configured to journal a change to a file system of a guest operating system, monitor storage device access patterns to determine backup policies, and/or replicate volumes when mounted.

A filter may also include an application streaming filter configured to monitor input/output communications for attempts to access an application in order to automatically stream the application and/or detect a conflict between applications. A filter may also include a virtualization filter configured to receive an input/output communication or event and enforce isolation rules. In addition, a filter may include a security filter configured to enforce any of a variety of rules meant to prevent mishaps or malicious activity.

Embodiments of the instant disclosure may provide various features and advantages not provided by traditional filtering technologies. For example, an input/output filtering layer positioned outside of a guest operating system may be protected from disruptions or attacks that originate from within a guest operating system. Positioning this filtering layer outside of the guest operating system may also avoid leaving an undesired footprint in the guest operating system. In addition, performing filtering operations outside of a guest operating system may reduce the amount of operating-system-specific design and development required by traditional filtering techniques. Similarly, performing filtering operations outside of a hypervisor may require less hypervisor-specific design and development and may allow for filtering in the context of a hypervisor incapable of filtering or with insufficient filtering capabilities.

Figure 5:
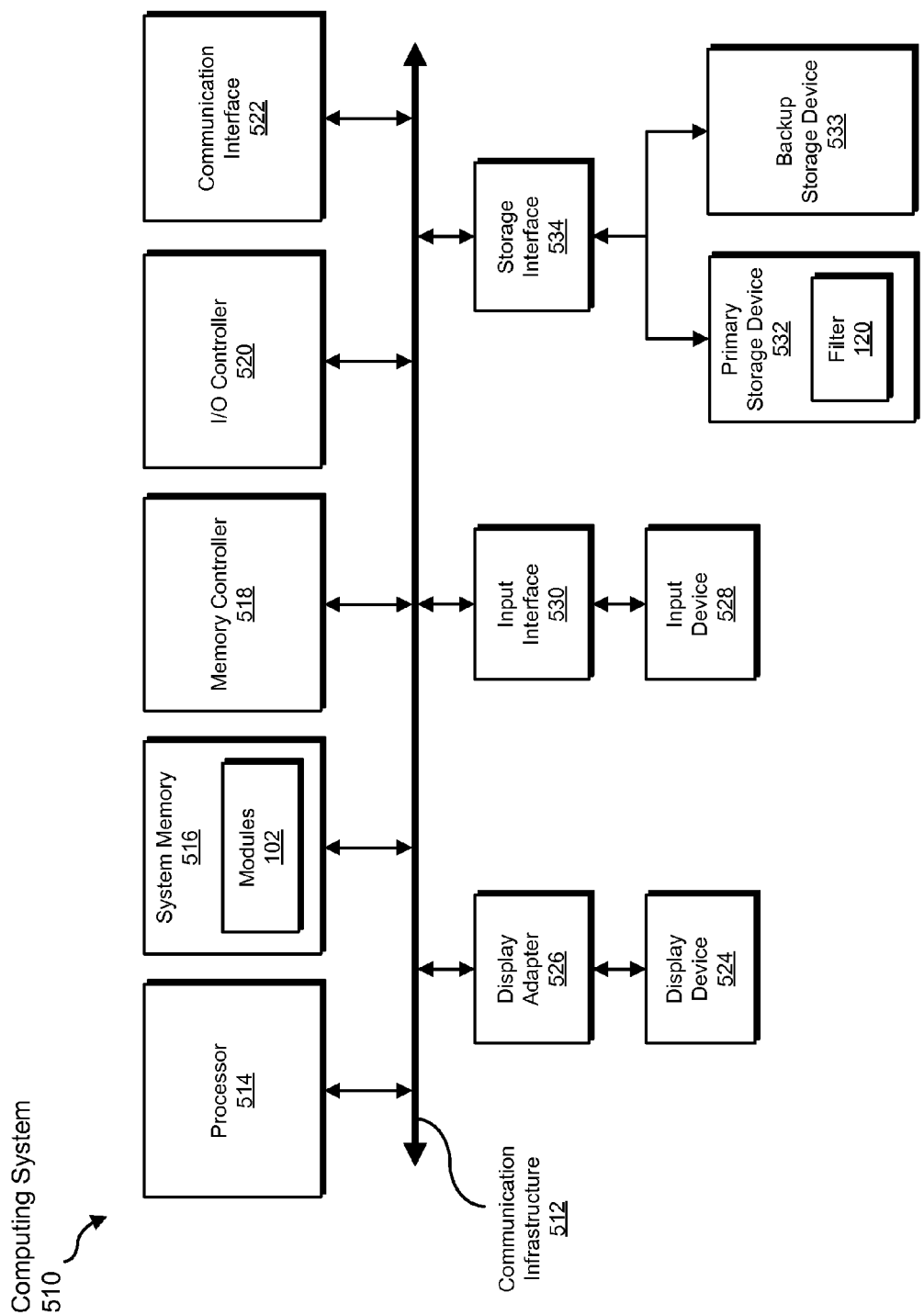
FIG. 5 is a block diagram of an exemplary computing system capable of implementing one or more of the embodiments described and/or illustrated herein.

FIG. 5 is a block diagram of an exemplary computing system 510 capable of implementing one or more of the embodiments described and/or illustrated herein. Computing system 510 broadly represents any single or multi-processor computing device or system capable of executing computer-readable instructions. Examples of computing system 510 include, without limitation, workstations, laptops, client-side terminals, servers, distributed computing systems, handheld devices, or any other computing system or device. In its most basic configuration, computing system 510 may include at least one processor 514 and a system memory 516.

Processor 514 generally represents any type or form of processing unit capable of processing data or interpreting and executing instructions. In certain embodiments, processor 514 may receive instructions from a software application or module. These instructions may cause processor 514 to perform the functions of one or more of the exemplary embodiments described and/or illustrated herein. For example, processor 514 may perform and/or be a means for performing, either alone or in combination with other elements, one or more of the identifying, creating, intercepting, performing, and/or inserting steps described herein. Processor 514 may also perform and/or be a means for performing any other steps, methods, or processes described and/or illustrated herein.

System memory 516 generally represents any type or form of volatile or non-volatile storage device or medium capable of storing data and/or other computer-readable instructions. Examples of system memory 516 include, without limitation, random access memory (RAM), read only memory (ROM), flash memory, or any other suitable memory device. Although not required, in certain embodiments computing system 510 may include both a volatile memory unit (such as, for example, system memory 516) and a non-volatile storage device (such as, for example, primary storage device 532, as described in detail below). In one example, one or more of modules 102 from FIG. 1 may be loaded into system memory 516.

In certain embodiments, exemplary computing system 510 may also include one or more components or elements in addition to processor 514 and system memory 516. For example, as illustrated in FIG. 5, computing system 510 may include a memory controller 518, an Input/Output (I/O) controller 520, and a communication interface 522, each of which may be interconnected via a communication infrastructure 512. Communication infrastructure 512 generally represents any type or form of infrastructure capable of facilitating communication between one or more components of a computing device. Examples of communication infrastructure 512 include, without limitation, a communication bus (such as an ISA, PCI, PCIe, or similar bus) and a network.

Memory controller 518 generally represents any type or form of device capable of handling memory or data or controlling communication between one or more components of computing system 510. For example, in certain embodiments memory controller 518 may control communication between processor 514, system memory 516, and I/O controller 520 via communication infrastructure 512. In certain embodiments, memory controller may perform and/or be a means for performing, either alone or in combination with other elements, one or more of the steps or features described and/or illustrated herein, such as identifying, creating, intercepting, performing, and/or inserting.

I/O controller 520 generally represents any type or form of module capable of coordinating and/or controlling the input and output functions of a computing device. For example, in certain embodiments I/O controller 520 may control or facilitate transfer of data between one or more elements of computing system 510, such as processor 514, system memory 516, communication interface 522, display adapter 526, input interface 530, and storage interface 534. I/O controller 520 may be used, for example, to perform and/or be a means for performing, either alone or in combination with other elements, one or more of the identifying, creating, intercepting, performing, and/or inserting steps described herein. I/O controller 520 may also be used to perform and/or be a means for performing other steps and features set forth in the instant disclosure.

Communication interface 522 broadly represents any type or form of communication device or adapter capable of facilitating communication between exemplary computing system 510 and one or more additional devices. For example, in certain embodiments communication interface 522 may facilitate communication between computing system 510 and a private or public network including additional computing systems. Examples of communication interface 522 include, without limitation, a wired network interface (such as a network interface card), a wireless network interface (such as a wireless network interface card), a modem, and any other suitable interface. In at least one embodiment, communication interface 522 may provide a direct connection to a remote server via a direct link to a network, such as the Internet. Communication interface 522 may also indirectly provide such a connection through, for example, a local area network (such as an Ethernet network), a personal area network, a telephone or cable network, a cellular telephone connection, a satellite data connection, or any other suitable connection.

In certain embodiments, communication interface 522 may also represent a host adapter configured to facilitate communication between computing system 510 and one or more additional network or storage devices via an external bus or communications channel. Examples of host adapters include, without limitation, SCSI host adapters, USB host adapters, IEEE 594 host adapters, SATA and eSATA host adapters, ATA and PATA host adapters, Fibre Channel interface adapters, Ethernet adapters, or the like. Communication interface 522 may also allow computing system 510 to engage in distributed or remote computing. For example, communication interface 522 may receive instructions from a remote device or send instructions to a remote device for execution. In certain embodiments, communication interface 522 may perform and/or be a means for performing, either alone or in combination with other elements, one or more of the identifying, creating, intercepting, performing, and/or inserting steps disclosed herein. Communication interface 522 may also be used to perform and/or be a means for performing other steps and features set forth in the instant disclosure.

As illustrated in FIG. 5, computing system 510 may also include at least one display device 524 coupled to communication infrastructure 512 via a display adapter 526. Display device 524 generally represents any type or form of device capable of visually displaying information forwarded by display adapter 526. Similarly, display adapter 526 generally represents any type or form of device configured to forward graphics, text, and other data from communication infrastructure 512 (or from a frame buffer, as known in the art) for display on display device 524.

As illustrated in FIG. 5, exemplary computing system 510 may also include at least one input device 528 coupled to communication infrastructure 512 via an input interface 530. Input device 528 generally represents any type or form of input device capable of providing input, either computer or human generated, to exemplary computing system 510. Examples of input device 528 include, without limitation, a keyboard, a pointing device, a speech recognition device, or any other input device. In at least one embodiment, input device 528 may perform and/or be a means for performing, either alone or in combination with other elements, one or more of the identifying, creating, intercepting, performing, and/or inserting steps disclosed herein. Input device 528 may also be used to perform and/or be a means for performing other steps and features set forth in the instant disclosure.

As illustrated in FIG. 5, exemplary computing system 510 may also include a primary storage device 532 and a backup storage device 533 coupled to communication infrastructure 512 via a storage interface 534. Storage devices 532 and 533 generally represent any type or form of storage device or medium capable of storing data and/or other computer-readable instructions. For example, storage devices 532 and 533 may be a magnetic disk drive (e.g., a so-called hard drive), a floppy disk drive, a magnetic tape drive, an optical disk drive, a flash drive, or the like. Storage interface 534 generally represents any type or form of interface or device for transferring data between storage devices 532 and 533 and other components of computing system 510. In one example, filter 120 from FIG. 1 may be stored in primary storage device 532.

In certain embodiments, storage devices 532 and 533 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 532 and 533 may also include other similar structures or devices for allowing computer software, data, or other computer-readable instructions to be loaded into computing system 510. For example, storage devices 532 and 533 may be configured to read and write software, data, or other computer-readable information. Storage devices 532 and 533 may also be a part of computing system 510 or may be a separate device accessed through other interface systems.

In certain embodiments, storage devices 532 and 533 may be used, for example, to perform and/or be a means for performing, either alone or in combination with other elements, one or more of the identifying, creating, intercepting, performing, and/or inserting steps disclosed herein. Storage devices 532 and 533 may also be used to perform and/or be a means for performing other steps and features set forth in the instant disclosure.

Many other devices or subsystems may be connected to computing system 510. Conversely, all of the components and devices illustrated in FIG. 5 need not be present to practice the embodiments described and/or illustrated herein. The devices and subsystems referenced above may also be interconnected in different ways from that shown in FIG. 5. Computing system 510 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable medium. The phrase "computer-readable medium" generally refers to any form of device, carrier, or medium capable of storing or carrying computer-readable instructions. Examples of computer-readable media include, without limitation, transmission-type media, such as carrier waves, and physical media, such as magnetic-storage media (e.g., hard disk drives and floppy disks), optical-storage media (e.g., CD- or DVD-ROMs), electronic-storage media (e.g., solid-state drives and flash media), and other distribution systems.

The computer-readable medium containing the computer program may be loaded into computing system 510. All or a portion of the computer program stored on the computer-readable medium may then be stored in system memory 516 and/or various portions of storage devices 532 and 533. When executed by processor 514, a computer program loaded into computing system 510 may cause processor 514 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, computing system 510 may be configured as an application specific integrated circuit (ASIC) adapted to implement one or more of the exemplary embodiments disclosed herein.

Figure 6:
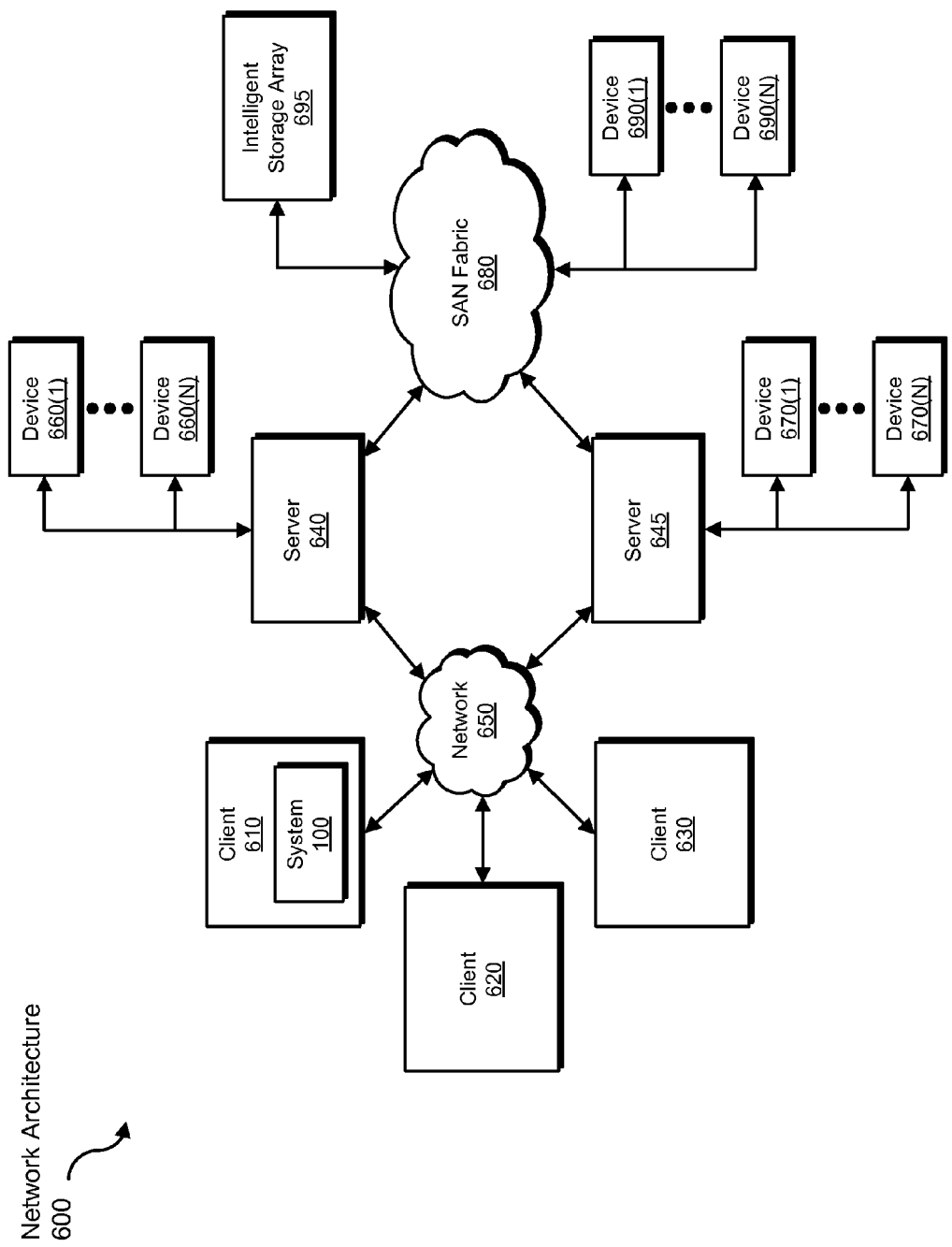
FIG. 6 is a block diagram of an exemplary computing network capable of implementing one or more of the embodiments described and/or illustrated herein.

FIG. 6 is a block diagram of an exemplary network architecture 600 in which client systems 610, 620, and 630 and servers 640 and 645 may be coupled to a network 650. Client systems 610, 620, and 630 generally represent any type or form of computing device or system, such as exemplary computing system 510 in FIG. 5. In one example, client system 610 may include system 100 from FIG. 1.

Similarly, servers 640 and 645 generally represent computing devices or systems, such as application servers or database servers, configured to provide various database services and/or run certain software applications. Network 650 generally represents any telecommunication or computer network including, for example, an intranet, a wide area network (WAN), a local area network (LAN), a personal area network (PAN), or the Internet.

As illustrated in FIG. 6, one or more storage devices 660(1)-(N) may be directly attached to server 640. Similarly, one or more storage devices 670(1)-(N) may be directly attached to server 645. Storage devices 660(1)-(N) and storage devices 670(1)-(N) generally represent any type or form of storage device or medium capable of storing data and/or other computer-readable instructions. In certain embodiments, storage devices 660(1)-(N) and storage devices 670(1)-(N) may represent network-attached storage (NAS) devices configured to communicate with servers 640 and 645 using various protocols, such as NFS, SMB, or CIFS.

Servers 640 and 645 may also be connected to a storage area network (SAN) fabric 680. SAN fabric 680 generally represents any type or form of computer network or architecture capable of facilitating communication between a plurality of storage devices. SAN fabric 680 may facilitate communication between servers 640 and 645 and a plurality of storage devices 690(1)-(N) and/or an intelligent storage array 695. SAN fabric 680 may also facilitate, via network 650 and servers 640 and 645, communication between client systems 610, 620, and 630 and storage devices 690(1)-(N) and/or intelligent storage array 695 in such a manner that devices 690(1)-(N) and array 695 appear as locally attached devices to client systems 610, 620, and 630. As with storage devices 660(1)-(N) and storage devices 670(1)-(N), storage devices 690(1)-(N) and intelligent storage array 695 generally represent any type or form of storage device or medium capable of storing data and/or other computer-readable instructions.

In certain embodiments, and with reference to exemplary computing system 510 of FIG. 5, a communication interface, such as communication interface 522 in FIG. 5, may be used to provide connectivity between each client system 610, 620, and 630 and network 650. Client systems 610, 620, and 630 may be able to access information on server 640 or 645 using, for example, a web browser or other client software. Such software may allow client systems 610, 620, and 630 to access data hosted by server 640, server 645, storage devices 660(1)-(N), storage devices 670(1)-(N), storage devices 690(1)-(N), or intelligent storage array 695. Although FIG. 6 depicts the use of a network (such as the Internet) for exchanging data, the embodiments described and/or illustrated herein are not limited to the Internet or any particular network-based environment.

In at least one embodiment, all or a portion of one or more of the exemplary embodiments disclosed herein may be encoded as a computer program and loaded onto and executed by server 640, server 645, storage devices 660(1)-(N), storage devices 670(1)-(N), storage devices 690(1)-(N), intelligent storage array 695, or any combination thereof. All or a portion of one or more of the exemplary embodiments disclosed herein may also be encoded as a computer program, stored in server 640, run by server 645, and distributed to client systems 610, 620, and 630 over network 650. Accordingly, network architecture 600 may perform and/or be a means for performing, either alone or in combination with other elements, one or more of the identifying, creating, intercepting, performing, and/or inserting steps disclosed herein. Network architecture 600 may also be used to perform and/or be a means for performing other steps and features set forth in the instant disclosure.

As detailed above, computing system 510 and/or one or more components of network architecture 600 may perform and/or be a means for performing, either alone or in combination with other elements, one or more steps of an exemplary method for filtering input/output communications of guest operating systems. In one embodiment, such a method may include: 1) identifying a guest operating system running in a virtual machine, 2) creating an input/output filtering layer that resides outside the guest operating system, 3) intercepting, at the input/output filtering layer, an input/output communication involving the guest operating system, and then 4) performing a filtering operation on the input/output communication.

In some embodiments, creating the input/output filtering layer may include creating the input/output filtering layer outside a hypervisor that monitors the virtual machine. In some embodiments, creating the input/output filtering layer may include creating the input/output filtering layer between the hypervisor and the guest operating system. In other embodiments, creating the input/output filtering layer may include creating the input/output filtering layer between the hypervisor and a set of hardware devices.

In some embodiments, identifying the guest operating system may include detecting instantiation of the guest operating system under the hypervisor. Various further embodiments may include inserting the input/output filtering layer between the hypervisor and the guest operating system.

According to certain embodiments, creating the input/output filtering layer may include creating the input/output filtering layer between the guest operating system and a set of hardware devices. Some embodiments may include inserting an agent, which may communicate with the input/output filtering layer, into the guest operating system. In some further embodiments, intercepting the input/output communication may include receiving a high-level input/output event from the agent.

Certain embodiments may include inserting a filter, which may perform the filtering operation, into the input/output filtering layer. According to some further embodiments, the filter may perform the filtering operation by: 1) monitoring input/output communications involving the guest operating system, 2) modifying the behavior of the guest operating system, 3) expanding the capabilities of the guest operating system, and/or 4) expanding the capabilities of the virtual machine.

In some embodiments, the filter may include: 1) an antivirus filter, 2) a backup filter, 3) an application streaming filter, 4) a virtualization filter, and/or 5) a security filter. In some embodiments, the filtering layer may not reside in a hypervisor layer.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

While various embodiments have been described and/or illustrated herein in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

In certain embodiments, one or more of the software modules disclosed herein may be implemented in a cloud computing environment. Cloud computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In addition, one or more of the software modules described herein may transform data, physical devices, and/or representations of physical devices from one form to another. For example modules 102 from FIG. 1 may transform a storage device into a filtering device by storing filtering instructions and/or rule sets on the storage device and reading from the storage device in order to filter input/output communications.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "a" or "an," as used in the specification and claims, are to be construed as meaning "at least one of." In addition, for ease of use, the words "including" and "having," as used in the specification and claims, are interchangeable with and have the same meaning as the word "comprising."

What is claimed is:

1. A computer-implemented method for filtering input/output communications of guest operating systems, the computer-implemented method comprising:
   identifying a guest operating system running in a virtual machine that is monitored by a hypervisor;
   creating an input/output filtering layer for filtering communications involving the guest operating system, wherein:
      the input/output filtering layer resides outside the virtual machine; and
      the input/output filtering layer resides outside, and is separate from, a layer that contains the hypervisor;

inserting at least a first portion of the input/output filtering layer between the virtual machine and the hypervisor;
inserting at least a second portion of the input/output filtering layer between the hypervisor and a set of hardware devices;
intercepting, at at least one of the first portion and the second portion of the input/output filtering layer, an input/output communication involving the guest operating system; and
performing a filtering operation on the input/output communication;
wherein the computer-implemented method is performed by a computing device that comprises at least one processor.

2. The computer-implemented method of claim 1, wherein identifying the guest operating system comprises detecting instantiation of the guest operating system under the hypervisor.

3. The computer-implemented method of claim 2, further comprising inserting the first portion of the input/output filtering layer between the hypervisor and the guest operating system in response to detecting the instantiation of the guest operating system.

4. The computer-implemented method of claim 1, wherein creating the input/output filtering layer comprises creating a portion of the input/output filtering layer between the guest operating system and the set of hardware devices.

5. The computer-implemented method of claim 1, further comprising inserting an agent into the guest operating system, wherein the agent communicates with the input/output filtering layer.

6. The computer-implemented method of claim 5, wherein intercepting the input/output communication comprises receiving a high-level input/output event from the agent.

7. The computer-implemented method of claim 1, further comprising inserting a filter into the input/output filtering layer, wherein the filter performs the filtering operation.

8. The computer-implemented method of claim 7, wherein the filter performs the filtering operation by at least one of:
monitoring input/output communications involving the guest operating system;
modifying the behavior of the guest operating system;
expanding the capabilities of the guest operating system; and
expanding the capabilities of the virtual machine.

9. The computer-implemented method of claim 7, wherein the filter comprises at least one of:
an anti-virus filter;
a backup filter;
an application streaming filter;
a virtualization filter; and
a security filter.

10. A system for filtering input/output communications of guest operating systems, the system comprising:
a detection module programmed to identify a guest operating system running in a virtual machine that is monitored by a hypervisor;
an insertion module programmed to create an input/output filtering layer for filtering communications involving the guest operating system at least in part by:
inserting at least a first portion of the input/output filtering layer between the virtual machine and the hypervisor; and
inserting at least a second portion of the input/output filtering layer between the hypervisor and a set of hardware devices, wherein:
the input/output filtering layer resides outside the virtual machine; and
the input/output filtering layer resides outside, and is separate from, a layer that contains the hypervisor;
an intercept module programmed to intercept, at at least one of the first portion and the second portion of the input/output filtering layer, an input/output communication involving the guest operating system;
a filtering module programmed to perform a filtering operation on the input/output communication; and
at least one processor configured to execute the detection module, the insertion module, the intercept module, and the filtering module.

11. The system of claim 10, wherein the detection module is programmed to identify the guest operating system by detecting instantiation of the guest operating system under the hypervisor.

12. The system of claim 11, wherein the insertion module is further programmed to insert the first portion of the input/output filtering layer between the hypervisor and the guest operating system in response to detecting the instantiation of the guest operating system.

13. A non-transitory computer-readable storage medium comprising one or more computer-executable instructions that, when executed by at least one processor of a computing device, cause the computing device to:
identify a guest operating system running in a virtual machine that is monitored by a hypervisor;
create an input/output filtering layer for filtering communications involving the guest operating system, wherein:
the input/output filtering layer resides outside the virtual machine; and
the input/output filtering layer resides outside, and is separate from, a layer that contains the hypervisor;
insert at least a first portion of the input/output filtering layer between the virtual machine and the hypervisor;
insert at least a second portion of the input/output filtering layer between the hypervisor and a set of hardware devices;
intercept, at at least one of the first portion and the second portion of the input/output filtering layer, an input/output communication involving the guest operating system; and
perform a filtering operation on the input/output communication.

* * * * *

UNITED STATES PATENT AND TRADEMARK OFFICE
CERTIFICATE OF CORRECTION

PATENT NO. : 8,490,086 B1
APPLICATION NO. : 12/495420
DATED : July 16, 2013
INVENTOR(S) : Randall R. Cook and Kenneth Berryman It is certified that error appears in the above-identified patent and that said Letters Patent is hereby corrected as shown below:

In the Claims:

Claim 1, at column 15, line 6, should read:

intercepting, at least one of the first portion and the

Claim 10, at column 16, line 14, should read:

an intercept module programmed to intercept, at least

Claim 13, at column 16, line 49, should read:

intercept, at least one of the first portion and the second

Signed and Sealed this
Twelfth Day of November, 2013

Teresa Stanek Rea
*Deputy Director of the United States Patent and Trademark Office*